United States Patent [19]

Levine

[11] Patent Number: 5,048,572
[45] Date of Patent: Sep. 17, 1991

[54] VIBRATION DAMPING HEAT SHRINKABLE TUBING

[75] Inventor: Herbert R. Levine, Dover, N.H.

[73] Assignee: Essex Group, Inc., Fort Wayne, Ind.

[21] Appl. No.: 108,849

[22] Filed: Oct. 15, 1987

[51] Int. Cl.⁵ .......................... F16L 9/00; F16L 11/11
[52] U.S. Cl. ................................... 138/121; 138/110;
   138/137; 138/177; 138/178; 174/DIG. 8
[58] Field of Search ............... 138/110, 103, 121, 122,
   138/173, 177, 178, 137, 113, 114, 148, 149;
   16/110 R, DIG. 12; 174/DIG. 8; 428/35, 36,
   913, 34.9

[56] References Cited

U.S. PATENT DOCUMENTS

| | | | |
|---|---|---|---|
| 2,140,157 | 12/1938 | Huffman | 16/DIG. 12 |
| 2,466,719 | 4/1949 | McKearnin | 176/DIG. 2 |
| 2,871,899 | 2/1959 | Coyle et al. | 16/DIG. 12 |
| 3,173,196 | 3/1965 | Grimm | 138/114 |
| 3,189,069 | 6/1965 | Stowell | 16/110 R |
| 3,201,861 | 8/1965 | Fromson et al. | 138/114 X |
| 3,270,454 | 9/1966 | Lachonce | 16/110 R |
| 3,531,822 | 10/1970 | Bush | 16/110 |
| 3,716,433 | 2/1973 | Plummer | 16/110 R |
| 4,016,356 | 4/1977 | McLoughlin | 174/DIG. 8 |
| 4,168,192 | 9/1979 | Nyberg | 174/DIG. 8 |
| 4,467,002 | 8/1984 | Grofts | 174/DIG. 8 |
| 4,576,207 | 3/1986 | Levine et al. | 138/177 |

FOREIGN PATENT DOCUMENTS 806479 4/1951 Fed. Rep. of Germany ..... 16/DIG. 12

Primary Examiner—James E. Bryant, III
Attorney, Agent, or Firm—Mark F. Smith

[57] ABSTRACT

Heat shrinkable tubing is disclosed which provides cushioning and vibration damping particularly useful for hand held power driven equipment. The tubing is extruded with internal ridges running along its entire length, which when heat shrunk on a substrate provides air pockets for cushioning and vibration damping. Embodiments disclosed include multiple layers of such material and multiple layers with smooth and texturized layers extruded concentrically on the primary vibration damping layers.

8 Claims, 2 Drawing Sheets

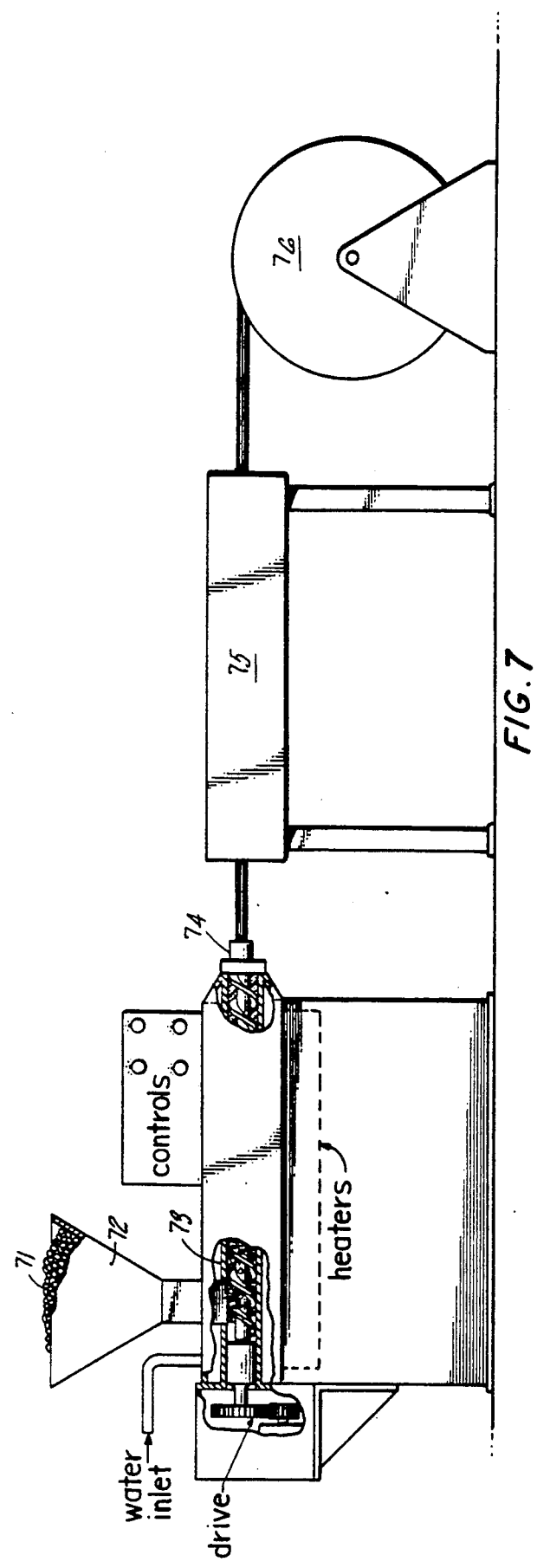

VIBRATION DAMPING HEAT SHRINKABLE TUBING

DESCRIPTION

1. Technical Field

The field of art to which this invention pertains is heat shrinkable polymer tubing.

2. Background Art

Heat shrinkable tubing has been in existence for many years. The use of heat shrinkable tubing, when properly formulated, provides a quick and economical method of covering various materials for a variety of purposes. For example, heat shrinkable tubing may be applied to a material for electrical insulation purposes, for protection against the elements, or to improve the feel of the material to the hand. Because of the wide variety of uses of such material there is an ongoing search for ways to improve the tubing itself, the manner in which it can be applied, improvement in its appearance, and its performance in the heat shrink operation. For example, it has been known that when applying heat shrinkable tubing to complex shaped articles containing many bends, expanded and depressed areas, that the tubing can have a tendency to wrinkle upon shrinkage, particularly at the inside radius of curved portions of the article to be covered. Some improvements in this regard have already been made. Note commonly assigned U.S. Pat. No. 4,576,207. However, there is still room for improvements in this area which have the potential of opening up entirely new areas of use for such articles.

DISCLOSURE OF INVENTION

The present invention is directed to heat shrinkable tubing having radial and longitudinal shrinkage memory with substantially parallel raised portions along the entire interior length of the tubing. In use, such tubing shrinks in response to exposure of heat to provide areas of cushioning and vibration damping to the substrate applied to.

Another aspect of the invention is multiple layers of such tubing concentrically laid next to one another.

Another aspect of the invention is the above tubing with a smooth layer of heat shrinkable tubing concentrically overcoating the layer or layers of raised-portion tubing.

Another aspect of the invention is the above tubing overcoated with a concentric layer of heat shrinkable tubing having substantially parallel raised portions extending along the entire exterior length of the tubing.

Another aspect of the invention includes the method of applying such tubing to a substrate to provide a cushioned, vibration damping layer (or layers) on the substrate.

The foregoing, and other features and advantages of the present invention, will become more apparent from the following description and accompanying drawings.

BRIEF DESCRIPTION OF THE DRAWINGS

FIG. 7 shows a typical apparatus for making tubing according to the present invention.

BEST MODE FOR CARRYING OUT THE INVENTION

Polyvinyl chloride is a typical polymeric material useful for making the tubing according to the present invention. However, because of its cost and polymeric properties such as abrasion resistance, other materials such as silicone, polyolefin, neoprene, ethylene-propylene-diene terpolymer, etc. can also be utilized (either alone or in admixture) based on the correlation of polymer properties and intended use. These materials are purchased commercially in either pellet or granular form and fed as such into extrusion apparatus. These materials can be used singularly for each layer in the multilayer embodiments or different materials can be used for each layer.

The polymeric materials are extruded in continuous lengths and typically wrapped upon a take up reel after formulation. The inner diameters and thicknesses of the respective layers vary depending on the intended used of product but will typically range from about 40 mils to about 5 inches in expanded inside diameter with recovered wall thicknesses ranging from 5 mils to 0.3 inches. This recovered wall thickness applies to each individual layer even of the multilayer embodiments.

While the preferred texturized patterns on the heat shrinkable tubing are raised, substantially parallel lines (a "corduroy" pattern) any pattern which provides raised or uneven portions on the interior surface of the otherwise smooth tubing are acceptable. For example, intermittent rather tan continuous lines may be used.

As formed, the heat-shrink materials according to the present invention typically contain about 5% to about 30% longitudinal shrinkage memory. Such memory is built into the tubing by processing under tension as described below. This allows the tubing to be heat-shrunk over a variety of complex shapes without creasing, crimping or wrinkling upon shrinkage onto the intended substrate.

Figure 1:
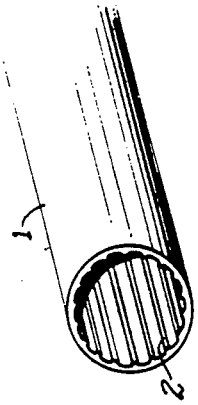
FIG. 1 shows a typical heat shrinkable tubing according to the present invention.

Referring to the figures, in FIG. 1 the heat shrinkable tubing (1) is shown with the raised ribs (2) on the interior surface of the tubing.

Figure 2:
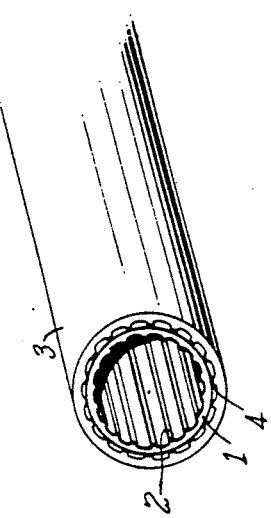
FIG. 2 shows a typical multilayer tubing with interior raised portions according to the present invention.

FIG. 2 shows a multilayer embodiment of the present invention with two heat shrink tubes extruded one on top of the other providing an added cushioning, vibration damping effect. Tube (1) with ribs (2) is similar to that shown in FIG. 1 with tube (3) with ribs (4) superimposed upon it.

Figure 3:
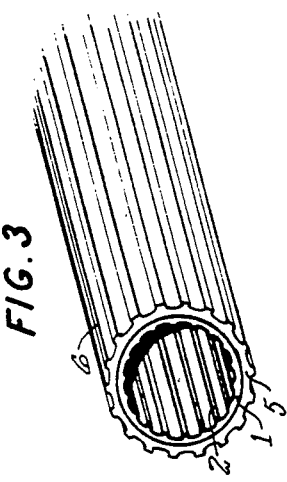
FIGS. 3 and 4 show multilayer embodiments of the present invention having both interior and exterior raised portions.
Figure 4:
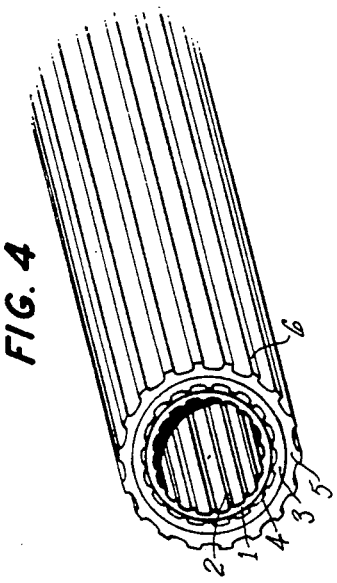

FIG. 3 shows an embodiment with an inner tube (1) with ribs (2) similar to that shown in FIG. 1 having superimposed thereon a texturized heat shrink tubing (5) with ribs on the exterior surface (6). FIG. 4 is similar to FIG. 3 and FIG. 2 so far as the interior tubes (1) and (3) are similar to those set forth in FIG. 2 and the exterior tube (5) has exterior raised portions (6) similar to that shown in FIG. 3. The texturized surface in both FIGS. 3 and 4 shrinks uniformly with the inner tubes not only providing a comfortable friction-grippable surface but a pleasant decorative finish as well. This coupled with the cushioning, vibration dampening inner tubes provides a particularly attractive, vibration damped product.

Figure 5:
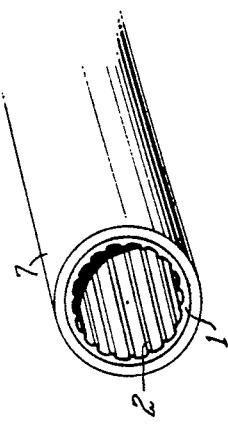
FIGS. 5 and 6 show multilayer embodiments of the present invention having interior raised portions and exterior smooth portions.
Figure 6:
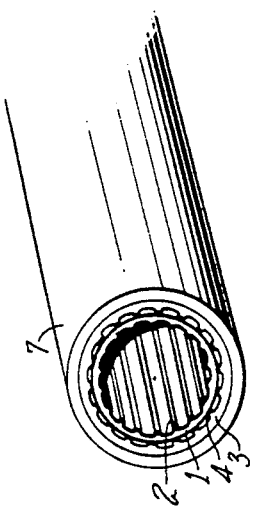

FIG. 5 shows an embodiment where an inner tube (1) with raised surfaces (2) has extruded thereon a concentric smooth tube (7) to provide a smooth, comfortable exterior surface. FIG. 6 is similar to FIG. 2 having multiple vibration damping inner tubes and also similar to FIG. 5 having an exterior tube 7 with a smooth surface.

Referring to FIG. 7 a better understanding of the method is demonstrated. Polymeric pellets or granules (71) are added to the extruder hopper (72). The polymeric material is reduced to a plastic state in the heated barrel (73) of the extruder and is forced by a rotating screw in the barrel (73) through extrusion head (74). The extruded tubing immediately is drawn through cooling bath (75) while it is held in tension. Following exit from the cooling bath the tubing is wrapped up on take-up reel (76). Following extrusion and takeup, the tubing is unwound and reheated, for example, by passing it through a heating fluid (such as Carbowax). A positive pressure (e.g. air) is imparted to the inside of the heated tubing to cause the desired degree of radial expansion. At the same time, the desired degree of linear shrinkage characteristics are imparted to the reheated tubing by holding it in tension, for example between a pinch roller and capstan device. For the multiple layer embodiments the same apparatus will be used with a multiple extrusion head in the area of the extrusion head (74) shown in FIG. 7 for coextrusion of the multiple layers. If different polymeric material is used for the different layers a separate supply of polymer pellets and additional extruder hoppers will also be necessary.

Shrinkage of the extruded tubing is effected by any heat source conventionally used in this art such as a hot air blower, infrared heater, oven, heat tunnel, etc. Since a 5% to 30% longitudinal shrinkage memory is built into the tubing, a corresponding linear excess of material should be used to ensure proper coverage of any article being covered.

The heat shrinkable tubing of the present invention in addition to shrinking in uniform, nonwrinkling fashion, is particularly useful for providing cushioning and vibration dampening on such hand held internal combustion driven power equipment such as chain saws, lawn mowers, snow blowers, etc. capable of producing high levels of undesirable vibration. Such vibration can cause fatigue and interfere with optimum levels of operation. The tubing of the present invention applied to the gripping handles of such equipment affords a significantly high level of vibration isolation useful with such products. Furthermore, it can be made with standard extrusion and expansion process equipment currently employed in the heat shrinkable tubing industry.

The number and arrangement of the multiplicity of longitudinal ribs or ridges are of sufficient height, number and configuration as to permit this shock absorbing feature. Typically 6 to 20 ridges per inch along the internal circumference of the tube are used having a height of 0.05 inch to 0.35 inch, although this would be a design consideration determined by such things as the amount of vibration damping desired, the particular polymeric material used, the particular design of the handle of the substrate, etc.

Although this invention has been shown and described with respect to detailed embodiments thereof, it will be understood by those skilled in the art that various changes in form and detail thereof may be made without departing from the spirit and scope of the claimed invention.

What is claimed is:

1. Heat shrinkable tubing comprising an interior and exterior layer of tubular polymeric material concentrically extruded one on the other, the tubing having radial shrinkage memory and longitudinal shrinkage memory, the interior tubular polymeric material having substantially parallel raised portions along its entire interior length, such heat shrinkable article capable of shrinking in response to heat in uniform fashion to provide areas of cushioning and vibration damping after application to a substrate.

2. The tubing of claim 1 wherein the exterior tubular polymeric material has a smooth exterior surface and substantially parallel raised portions along its entire interior length.

3. The tubing of claim 1 wherein the exterior tubular polymeric material has substantially parallel raised portions extending along its entire exterior length.

4. The tubing of claim 1 wherein the exterior tubular polymeric material is smooth on its exterior and interior surfaces.

5. A method of forming a cushioned, vibration damping surface on a substrate comprising placing a heat shrinkable tubing on the substrate, applying heat to the tubing causing the tubing to shrink both radially and linearly on the substrate wherein the heat shrinkable tubing comprises an interior and exterior layer of tubular polymeric material concentrically extruded one on the other, the tubing having radial shrinkage memory and longitudinal shrinkage memory, the interior tubular polymeric material having substantially parallel raised portions along its entire interior length, such heat shrinkable article shrinking in response to the heat in uniform fashion to provide areas of cushioning and vibration damping after application to the substrate.

6. The method of claim 5 wherein the exterior tubular polymeric material has a smooth exterior surface and substantially parallel raised portions along its entire interior length.

7. The method of claim 5 wherein the exterior tubular polymeric material has substantially parallel raised portions extending along its entire exterior length.

8. The method of claim 5 wherein the exterior tubular polymeric material is smooth on its exterior and interior surfaces.

* * * * *